(12) United States Patent
Celi et al.

(10) Patent No.: US 10,137,962 B2
(45) Date of Patent: Nov. 27, 2018

(54) DERAILLEUR WITH DAMPER OF THE CHAIN GUIDE

(71) Applicant: CAMPAGNOLO S.r.l., Vicenza (IT)

(72) Inventors: Gabriele Celi, Asti (IT); Alex Viglierco, Castellamonte (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/617,783

(22) Filed: Jun. 8, 2017

(65) Prior Publication Data

US 2017/0355423 A1    Dec. 14, 2017

(30) Foreign Application Priority Data

Jun. 10, 2016  (IT) .......................... UA2016A004291

(51) Int. Cl.

| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/126* | (2010.01) |
| *F16F 9/19* | (2006.01) |
| *F16F 9/516* | (2006.01) |
| *B62M 9/122* | (2010.01) |

(Continued)

(52) U.S. Cl.
CPC ............ *B62M 9/126* (2013.01); *B62M 9/122* (2013.01); *B62M 9/1244* (2013.01); *B62M 9/1248* (2013.01); *F16F 9/19* (2013.01); *F16F 9/516* (2013.01); *F16H 7/1236* (2013.01)

(58) Field of Classification Search
CPC ...... B62M 9/122; B62M 9/126; B62M 25/08; B62M 9/1244; B62M 9/16

USPC ..................................................... 474/80, 82
See application file for complete search history.

(56) References Cited

U.S. PATENT DOCUMENTS 6,042,495 A * 3/2000 Patterson ............... B62M 9/122
                                                                 474/78
6,135,904 A * 10/2000 Guthrie ................. B62M 9/122
                                                                 474/82

(Continued)

FOREIGN PATENT DOCUMENTS

JP         H02 169383 A    6/1990

OTHER PUBLICATIONS

Italian Search Report and Written Opinion in Italian Application No. UA2016A004291, dated Jan. 31, 2017, with English translation.

*Primary Examiner* — Henry Y Liu
(74) *Attorney, Agent, or Firm* — Volpe and Koenig, P.C.

(57) ABSTRACT

The derailleur has a damper that breaks the angular movements of a chain guide. Variable volume chambers in the damper are filled with a damping fluid and connected through a controlled fluid passage system so that fluid flows between chambers in response to angular movement of the chain guide. The damper comprises a dividing body in a mobile body coaxial to the axis X, mechanically constrained so that each rotation of the dividing body about the axis X is accompanied by a translation of the dividing body along the axis X. The dividing body is mechanically constrained to the chain guide and moves with it in the angular direction about the axis X. The chambers are formed in the mobile body on opposite sides of the dividing body and change volume in opposite directions when the dividing body moves along the axis X.

11 Claims, 8 Drawing Sheets

(51) Int. Cl.
*B62M 9/1244* (2010.01)
*B62M 9/1248* (2010.01)
*F16H 7/12* (2006.01)

(56) References Cited

U.S. PATENT DOCUMENTS

| | | | | |
|---|---|---|---|---|
| 7,549,662 | B2 * | 6/2009 | Righi | B62M 9/122 |
| | | | | 280/257 |
| 8,870,692 | B2 * | 10/2014 | Yamaguchi | B62M 9/126 |
| | | | | 474/80 |
| 8,870,693 | B2 * | 10/2014 | Shahana | B62M 9/121 |
| | | | | 474/80 |
| 8,882,618 | B2 * | 11/2014 | Yamaguchi | B62M 9/122 |
| | | | | 474/80 |
| 8,900,078 | B2 * | 12/2014 | Yamaguchi | B62M 9/1244 |
| | | | | 474/80 |
| 2002/0187867 | A1 * | 12/2002 | Ichida | B62K 23/06 |
| | | | | 474/82 |
| 2007/0219029 | A1 * | 9/2007 | Turner | B62M 9/16 |
| | | | | 474/80 |
| 2013/0090196 | A1 * | 4/2013 | Yamaguchi | B62M 9/122 |
| | | | | 474/80 |
| 2013/0288834 | A1 * | 10/2013 | Yamaguchi | B62M 9/126 |
| | | | | 474/80 |
| 2015/0072816 | A1 * | 3/2015 | Yamaguchi | B62M 9/16 |
| | | | | 474/113 |
| 2015/0072817 | A1 * | 3/2015 | Yamaguchi | F16H 7/1227 |
| | | | | 474/113 |
| 2016/0176478 | A1 * | 6/2016 | Chang | B62M 9/121 |
| | | | | 474/69 |
| 2016/0304161 | A1 * | 10/2016 | Shirai | B62M 9/16 |

* cited by examiner

DERAILLEUR WITH DAMPER OF THE CHAIN GUIDE

CROSS REFERENCE TO RELATED APPLICATION(S)

This application claims the benefit of Italian Application No. UA2016A004291, filed on Jun. 10, 2016, which is incorporated herein by reference as if fully set forth.

FIELD OF INVENTION

The present invention relates to a derailleur of a bicycle gearshift; in particular, it relates to a rear derailleur, which allows the movements of the transmission chain among the different sprockets of a cogset.

BACKGROUND

A derailleur—in particular a rear derailleur—normally comprises a fixed body (also called upper body, due to the position that it typically occupies with respect to the rest of the derailleur once mounted) and a mobile body (also called lower body), connected to the fixed body by means of a connection mechanism that allows a movement of the mobile body with respect to the fixed body; a chain guide is then mounted in an angularly moveable manner on the mobile body. The fixed body is mounted on the bicycle frame, near to the cogset, and the mobile body is moved with respect to it by acting on the connection mechanism, so as to move the chain guide in the axial direction of the cogset and thus obtain the desired changes in gear ratio. The chain guide is in constant engagement with the chain, both to move it in the axial direction guiding it in passing from one sprocket to another, and to keep it under tension so as to compensate for the changes in length of theoretical path of the chain due to different gear ratios; for this purpose, an elastic system (normally a spring) is thus arranged between the mobile body and the chain guide, so as to allow the latter to apply the desired tension on the chain.

It is furthermore known that the elastic system by itself is not always sufficient to ensure that the chain guide keeps the chain adequately under tension. Indeed, in certain cases the chain can oscillate excessively, particularly due to sudden stresses caused by uneven roads, by impacts or whatever other reason. Also due to the substantial mass of the chain, these oscillations can have the chain hits or slides against fixed parts of the bicycle; indeed, it is possible for the chain to drop (undesired disengagement from one of the toothed wheels of the transmission), with consequent blocking of the transmission of motion. These drawbacks are particularly troublesome in racing bicycles or in any case high-performance bicycles.

In order to avoid these drawbacks, derailleurs have been made in which between the mobile body and the chain guide there is not only the elastic system but also a damper, namely a mechanical-hydraulic component that exerts a braking action proportional to the relative speed of movement of the chain guide with respect to the mobile body: in the presence of normal movements due to gearshifting (which are relatively slow), the braking action is substantially zero, and therefore the damper does not obstruct gearshifting; in the presence of sudden stresses due to accidental causes, the damper intervenes with a braking action of increasing amount as the speed of movement increases. Typically, the damper comprises a first and a second variable volume chamber filled with a damping fluid and in connection with each other through a controlled fluid passage system; the angular movement of the chain guide determines changes in volume in the opposite direction of the first and of the second chamber and consequently a fluid overflow between the first and the second chamber through the controlled fluid passage system. The braking action is substantially proportional to the speed of passage of the fluid from one chamber to the other, therefore to the speed of angular movement of the chain guide.

Furthermore, in order to improve dynamic performance, unidirectional dampers have been proposed, i.e. capable of braking the movements in one direction but not in the opposite direction; thanks to the use of these dampers, it is possible to ensure that the chain guide is braked when the external stress tends to move it, but not when—the stress having ended—the elastic system tends to take it back into its correct position. The result is that the system tends not only to effectively oppose external stresses, but also to quickly return into its normal position once the stress has finished.

Derailleurs of this kind are known for example from US 2015/0072816 A1 and from US 2007/219029 A1.

SUMMARY

The problem at the basis of the present invention is that of improving the performance of derailleurs of the type described above, ensuring an optimal damping efficiency with low size and weight.

This problem is solved by a derailleur according to claim 1; preferred features are given in the dependent claims.

More in particular, a derailleur according to the invention comprises a fixed body adapted for being mounted on the bicycle, a mobile body associated in a moveable manner with the fixed body, a chain guide mounted in an angularly moveable manner on the mobile body about an axis X and adapted for engaging a transmission chain, an elastic system between the chain guide and the mobile body to push the chain guide in a predetermined angular direction with respect to the mobile body so as to keep the transmission chain under tension, a damper between the chain guide and the mobile body to brake the angular movements of the chain guide with respect to the mobile body, wherein the damper comprises a first and a second variable volume chamber filled with a damping fluid and in connection with each other through a controlled fluid passage system, wherein the angular movement of the chain guide determines changes in volume in the opposite direction of the first and of the second chamber and consequently a fluid overflow between the first and the second chamber through the controlled fluid passage system, wherein the damper comprises a dividing body in the mobile body coaxial to the axis X, mechanically constrained so that each rotation of the dividing body about the axis X is accompanied by a translation of the dividing body along the axis X itself, the dividing body is mechanically constrained to the chain guide so as to move together with it in the angular direction about the axis X, the two first and second chambers are formed in the mobile body, on opposite sides of the dividing body, and thus change volume in the opposite direction when the dividing body moves in the mobile body along the axis X.

With this construction, the damper is integrated in the mobile body, with limited bulk (and weight), but with excellent damping efficiency, because the variable volume chambers can be of relatively large dimensions, with big changes in volume following the axial movements of the dividing body, and thus with a very high braking effect.

Preferably, the dividing body is mechanically constrained to the mobile body through a helical coupling, comprising an internal helix formed in the mobile body engaged with an external helix formed on the dividing body. With this coupling, transformation of the motion of the dividing body, from angular about the axis X (as imposed by the chain guide) to translational along the same axis X (to obtain the change in volume of the chambers and therefore the damping), or rather the coordination between these two movements, is simply, effectively and reliably obtained. The sliding friction between the two helixes is kept low by the same damping fluid, preferably selected so that it is also lubricating.

Preferably, the mobile body comprises:

a load-bearing body, having an annular shape about the axis X, in which the internal helix is formed.

The load-bearing body is advantageously used for mounting the mobile body on the fixed body.

Preferably, the mobile body comprises:

a first and a second closing body, mounted fixed in a tight manner on the load-bearing body on opposite sides in the direction of the axis X.

The provision of one or rather both of the closing bodies facilitates both the construction of the mobile body, and the maintenance thereof, if it needs to be dismounted.

Preferably, the mobile body comprises:

a trailing body, having an inner portion and an outer portion coaxial along the axis X and fixedly connected to one another, wherein the inner portion is enclosed between the load-bearing body and the first closing body, mounted in a tight rotatable manner about the axis X, and wherein the outer portion projects through an axial opening of the first closing body and is mounted fixedly connected to the chain guide.

This structure, with the trailing body rotatable together with the chain guide, makes it possible to have an element that undergoes the same movements as the chain guide inside the mobile body.

Preferably, the dividing body comprises a male portion and a female portion, coaxial along the axis X and fixedly connected to one another, wherein:

the male portion is slidably inserted in a tight manner in a cylindrical cavity formed in the inner portion of the trailing body, the first variable volume chamber being defined between this male portion and this cylindrical cavity, in the female portion a cylindrical cavity is formed that receives—in a sliding, rotatable and tight manner—a male portion of the second closing body, the second variable volume chamber being defined between this male portion and this cylindrical cavity, on the female portion of the dividing body the external helix is formed.

With this configuration, the dividing body actually operates functionally as a piston on one side, towards the first variable volume chamber, and as a cylinder on the opposite side, towards the second variable volume chamber. It is thus possible to independently size the section of the male portion (i.e. the section of the first chamber) and the section of the cylindrical cavity of the female portion (i.e. the section of the second chamber), according to the behavior that is wished to be set for the damper. For example, it is possible to establish different sections for the first and the second chamber, in order to have different braking effects in the two directions of movement of the dividing body.

Preferably, however, the male portion of the dividing body and the male portion of the second closing body, as well as the cylindrical cavity of the trailing body and the cylindrical cavity of the dividing body, have the same cross section. In this way, the movement of the dividing body determines identical changes in volume (and of opposite sign) for the two variable volume chambers. This condition is ideal in the case in which it is wished to have identical damping in the two directions, but it is also advantageous when it is wished to have differentiated damping: in this case, indeed, the damping differentiation can be obtained by suitably designing the controlled fluid passage system, without differences in change of volume of the two chambers imposing needless calculation complications.

Preferably, the dividing body is mechanically constrained to the trailing body and through this to the chain guide by means of at least one pin, extending parallel to the axis X and in longitudinal sliding engagement in holes formed in the dividing body and in the trailing body, respectively. This configuration makes it possible to simply, directly and safely link the angular movement of the chain guide to the movement of the dividing body. More preferably, there are two, three or more pins, so as to best distribute and balance the mechanical forces caused by the pulling.

Preferably, the controlled fluid passage system is adapted to allow the passage of fluid in a first direction through a calibrated nozzle, and to allow the passage of fluid in a second direction opposite the first direction through a port of much larger size with respect to the nozzle. In this way, damping is obtained substantially only in one direction of movement.

Preferably, the first direction is from the first to the second variable volume chamber and the second direction is from the second to the first variable volume chamber. The first direction of movement of the damping fluid thus corresponds to the condition in which the first chamber empties, i.e. reduces in volume as a consequence of the movement of the dividing body towards the first closing body; this movement is that associated with a movement of the chain guide in contrast to the push of the elastic means. A braking effect is thus obtained against sudden pushes on the chain guide that tend to make the tension of the chain suddenly drop, with a risk of it falling, whereas in the opposite direction the damping is zero or in any case negligible.

Preferably, the controlled fluid passage system comprises a directional valve inside which the nozzle and the port are formed. Valves of this type are available on the market, for example supplied by The Lee Company, such as the valves CFRM or CFFM.

According to another preferred embodiment, the controlled fluid passage system comprises a central channel in which the nozzle is housed and at least one peripheral channel in which the port is formed, provided with a mobile shutter that closes the port in the presence of a push of fluid in a predetermined direction.

Preferably, the controlled fluid passage system is housed in the dividing body.

BRIEF DESCRIPTION OF THE DRAWING(S)

Further features and advantages of a derailleur according to the invention will become clearer from the following description of preferred embodiments thereof, made with reference to the attached drawings. In such drawings.

DETAILED DESCRIPTION OF THE
PREFERRED EMBODIMENT(S)

Figure 1:
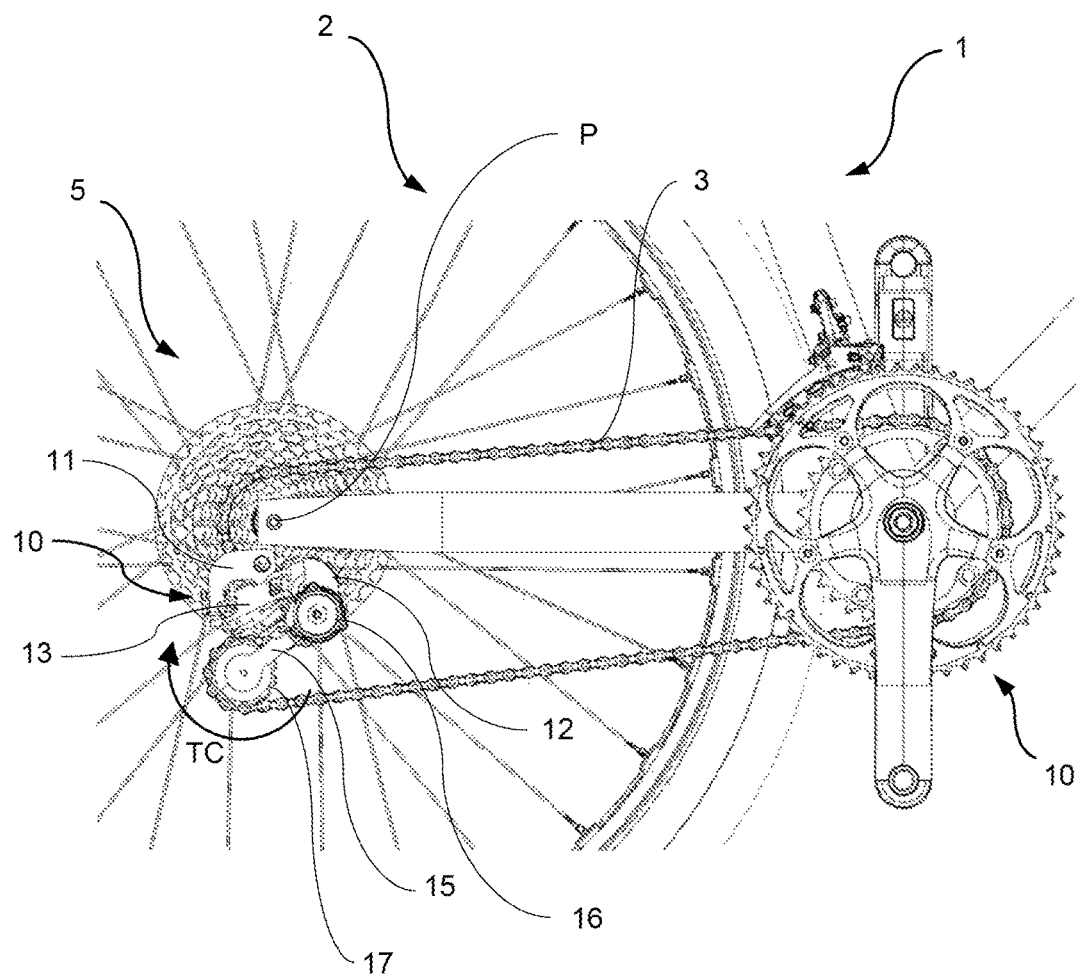
FIG. 1 is a schematic view of a bicycle transmission provided with a derailleur according to the invention.

FIG. 1 partially shows a bicycle 1, with a transmission 2 that comprises a chain 3 engaged with a crown gear of a set of crown gears 4 and with a sprocket of a cogset 5, extending along an axis P; the transmission 2 comprises a rear gearshift, with a gearshift control mounted on the handlebars of the bicycle 1 and not shown in FIG. 1 and a derailleur 10.

Figure 2:
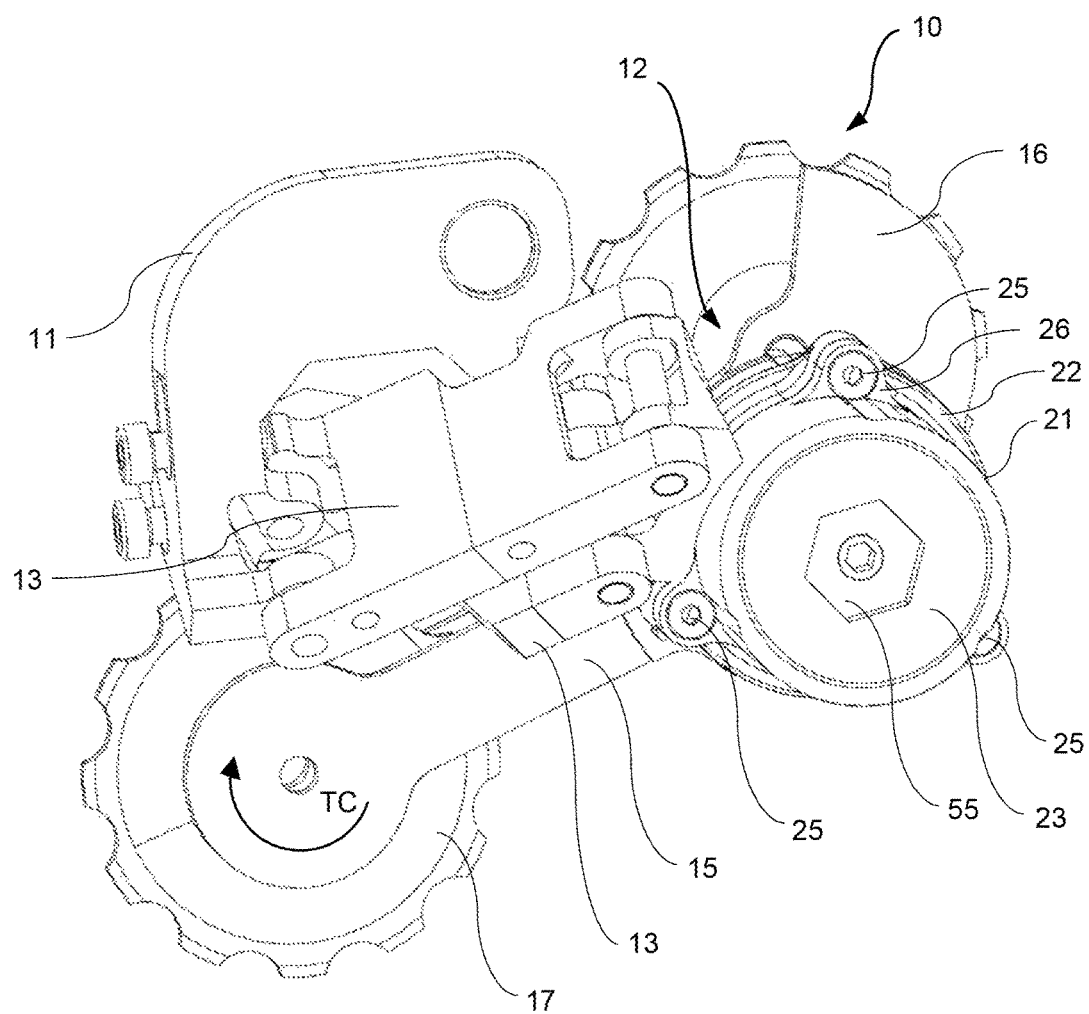
FIG. 2 is a perspective view of the derailleur according to the invention.

The derailleur 10, shown better in FIG. 2, comprises a fixed body 11, mounted on the bicycle 1, close to the cogset 5 in FIG. 1, and a mobile body 12, mounted in a moveable manner on the fixed body 11 by means of an articulated quadrilateral linkage (per se conventional), two connecting rods 13 of which are partially visible in FIG. 2. The derailleur 10 further comprises a chain guide 15, which is mounted in an angularly moveable manner on the mobile body 12 about an axis X, parallel to the axis P of the cogset 5, and comprises two coplanar idle wheels 16 and 17, engaged with the chain 3. The idle wheel 16 is coaxial to the axis X and therefore does not change its position with respect to the mobile body 12, whereas the idle wheel 17 is arranged at an opposite end of the chain guide 15 and changes its position as a function of the angular movements of the chain guide 15 with respect to the mobile body 12. The two idle wheels 16 and 17 move together in the direction of the axis X, as a function of the movements of the mobile body 12 with respect to the fixed body 11, so as to take the chain 3 on different sprockets of the cogset 5 and thus obtain different gear ratios.

Figure 3:
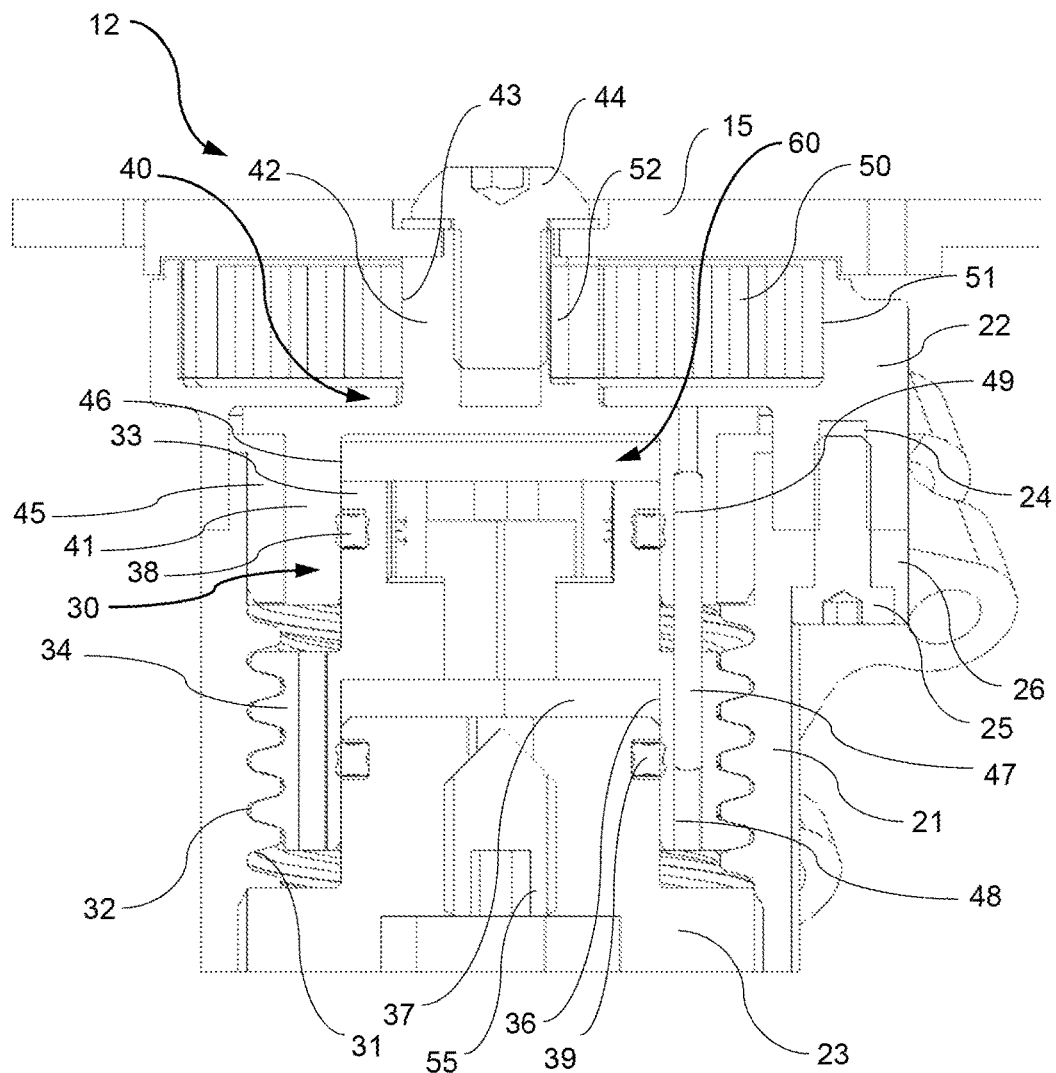
FIG. 3 is a section view of the mobile body of the derailleur of FIG. 2.

The mobile body 12, better shown in FIG. 3, comprises a load-bearing body 21, having a substantially annular shape around the axis X, closed at the two ends thereof along the axis X by a first closing body 22 and by a second closing body 23. The load-bearing body 21 is the part of mobile body 12 to which the connecting rods 13 are fixed.

The two first and second closing bodies 22 and 23 are mounted in a fixed tight manner on the load-bearing body 21. For this purpose, the first closing body 22 is provided with threaded holes 24 in which screws 25 are screwed, inserted in eyelets 26 of the load-bearing body 21; the second closing body 23, on the other hand, is screwed directly to the load-bearing body 21, by means of corresponding threadings.

A dividing body 30 is further mounted in the mobile body 12, said dividing body 30 being coaxial to the axis X, mechanically constrained to the load-bearing body 21 in the mobile body 12 by means of a helical coupling, with an internal helix 31 formed in the load-bearing body 21 and an external helix 32 formed on the dividing body 30. Thanks to this helical coupling, each rotation of the dividing body 30 about the axis X is accompanied by a translation of the dividing body 21 along the axis X itself, and vice-versa.

The mobile body 12 also comprises a trailing body 40, which comprises two portions fixedly connected to each other, coaxial along the axis X: an inner portion 41, enclosed between the load-bearing body 21 and the first closing body 22 and mounted in a rotary manner about the axis X, and an outer portion 42, projecting from the first closing body 22 through an axial opening 43, and mounted fixedly connected to the chain guide 15 by means of a screw 44. A bush 45 is arranged between the trailing body 40 and the load-bearing body 21, to ensure that there is a seal and the possibility of rotation between them.

The derailleur 10 comprises an elastic system between the chain guide 15 and the mobile body 12; this elastic system is formed from a spring 50, mounted on the first closing body 22 and fastening at an end 51 thereof to the first closing body 22 and at the other end 52 to the trailing body 40. The action of the spring 50 is in the sense of angularly pushing the trailing body 40 and with it the chain guide 15 in the direction that corresponds to a tensioning of the chain 3, indicated with TC in FIG. 2.

The dividing body 30 comprises a male portion 33 and a female portion 34, coaxial along the axis X and fixedly connected to each other. The male portion 33 is slidably inserted in a tight manner in a cylindrical cavity 46 formed in the inner portion 41 of the trailing body 40; between the male portion 33 and the cylindrical cavity 46 a first variable volume chamber 35 is defined. In the female portion 34 a cylindrical cavity 36 is formed that received—in a sliding, rotatable and tight manner—a male portion 27 of the second closing body 23; between the male portion 27 and the cylindrical cavity 36 a second variable volume chamber 37 is defined. The chambers 35 and 37 change their volume as a consequence of the axial movement of the dividing body 30 along the axis X: when the dividing body 30 moves towards the first closing body 22, the first chamber 35 decreases in volume whereas the second chamber 37 increases in volume; vice-versa, when the dividing body 30 moves towards the second closing body 23, the first chamber 35 increases in volume whereas the second chamber 37 decreases in volume. Between the male portion 33 and the cylindrical cavity 46 there is a sealing ring 38, just as between the male portion 27 and the cylindrical cavity 36 there is a sealing ring 39, so that the first and the second chamber 35 and 37 are sealed, whilst still having variable volume. The chambers 35 and 37 are filled with damping fluid (not highlighted in the figures), for example oil. On the female portion 34 of the dividing body 30 the external helix 32 of the helical coupling is formed.

The cross section of the male portion 33, of the male portion 27, as well as of the cylindrical cavities 46 and 36, is always the same, so that any change in volume in one of the chambers 35 or 37 is always accompanied by an equal but opposite change in the other chamber.

The second closing body 23 is provided with a screw cap 55, for filling the cavities 35 and 37 with the damping fluid.

The dividing body 30 is mechanically constrained to the chain guide 15 so as to move together with it in the angular direction about the axis X. For this purpose, the dividing body 30 is mechanically constrained to the trailing body 40, which—as stated—is fixedly connected to the chain guide 15 by the screw 44, by means of pins 47 extending parallel to the axis X (three pins in the example illustrated in the figures, arranged 120° apart about the axis X); the pins 47 are inserted free to slide in the longitudinal direction in holes 48 formed in the female portion 34 of the dividing body 30 and holes 49 formed in the inner portion 41 of the trailing body 40.

The derailleur 10 further comprises a controlled fluid passage system 60 between the two variable volume chambers 35 and 37, to allow the controlled overflow of damping fluid between the two chambers 35 and 37 when they undergo changes in volume. The fluid passage system 60 is provided in the dividing body 30, but it is not highlighted in FIG. 3.

The fluid passage system 60 is structured so as to be adapted for allowing fluid to pass in a first direction A through a calibrated nozzle, and for allowing fluid to pass in a second direction B opposite the first through a port of much greater size with respect to the nozzle; the first direction A of passage of the fluid is from the first chamber 35 to the second chamber 37, and thus corresponds to a movement of the dividing body 30 towards the first closing body 22, whereas the second direction B is from the second chamber 37 to the first chamber 35, and thus corresponds to a movement of the dividing body 30 towards the second closing body 23.

According to a first embodiment of the invention, shown in FIGS. 4 to 7, the fluid passage system 60 comprises a central channel 61 that passes axially through the dividing body 30; in the central channel 61 a calibrated nozzle 62 is housed, namely a narrow passage of accurately defined size as a function of the damping that is wished to be obtained when the dividing body 30 moves towards the first closing body 22. The fluid passage system 60 further comprises a plurality of peripheral channels 63, which as a whole form a passage port of much larger size than that of the calibrated nozzle 62. The peripheral channels 63 are regulated by respective mobile shutters 64 positioned so as to close the passage port when there is a push of fluid in the first direction A and so as to leave the passage port open when there is a push of fluid in the second direction B.

More precisely, each peripheral channel 63 comprises a main hole 65 and an auxiliary hole 66, which have a circular section and are beside one another, oriented in the direction of the axis X. The main hole 65 is a through hole, i.e. it completely passes through the dividing body 30, while towards the second chamber 37 it has a throttling 67. The auxiliary hole 66, on the other hand, is blind, i.e. it is open towards the first chamber 35 and not towards the second chamber 37, and communicates with the main hole 65 which it is next to. The mobile shutter 64 is formed from a ball, inserted in the main hole 65 and held therein on one side by the throttling 67, and on the other side by a thrust wheel 68; this thrust wheel 68 (one for all of the peripheral channels 63) is mounted centrally in the dividing body 30, held in position by the calibrated nozzle 62, for this purpose provided with a shoulder 69.

With this configuration of the fluid passage system 60, the following operation is obtained.

While the bicycle 1 is travelling, accidental events can cause sudden and anomalous thrusts on the chain guide 15. When these thrusts are in the direction TC, the result is a stress of greater traction on the chain 3 that normally does not cause big problems: the chain 3 withstands the thrust, without anomalous movements of the parts of the transmission 2 occurring. If, however, a thrust occurs on the chain guide 15 in the direction opposite to TC, then the chain guide 15 can move in the direction opposite to TC.

Figure 4:
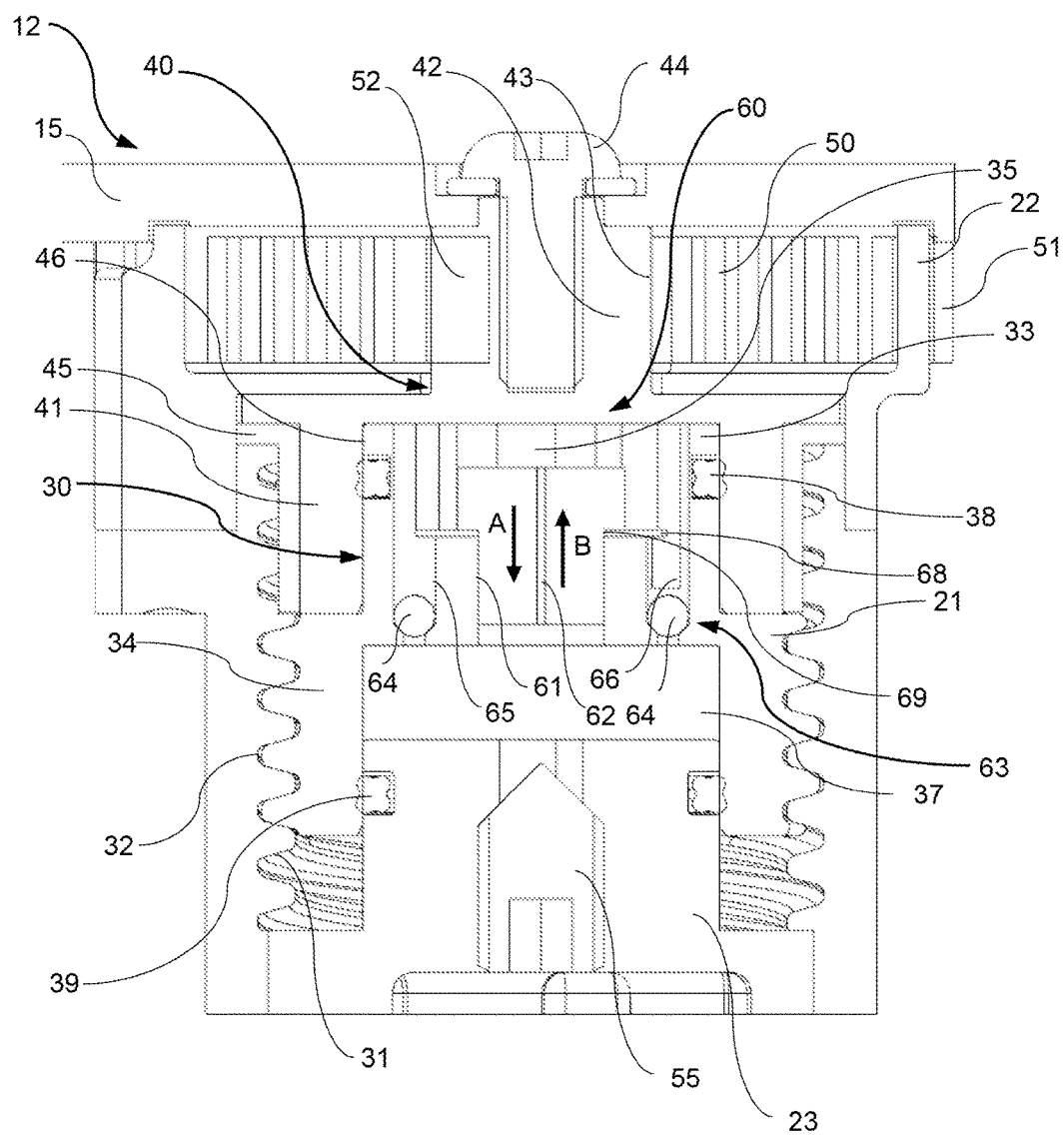
FIG. 4 is an enlarged section view of part of the mobile body of FIG. 3 according to a first embodiment of the invention, in a first, damping operating condition.
Figure 5:
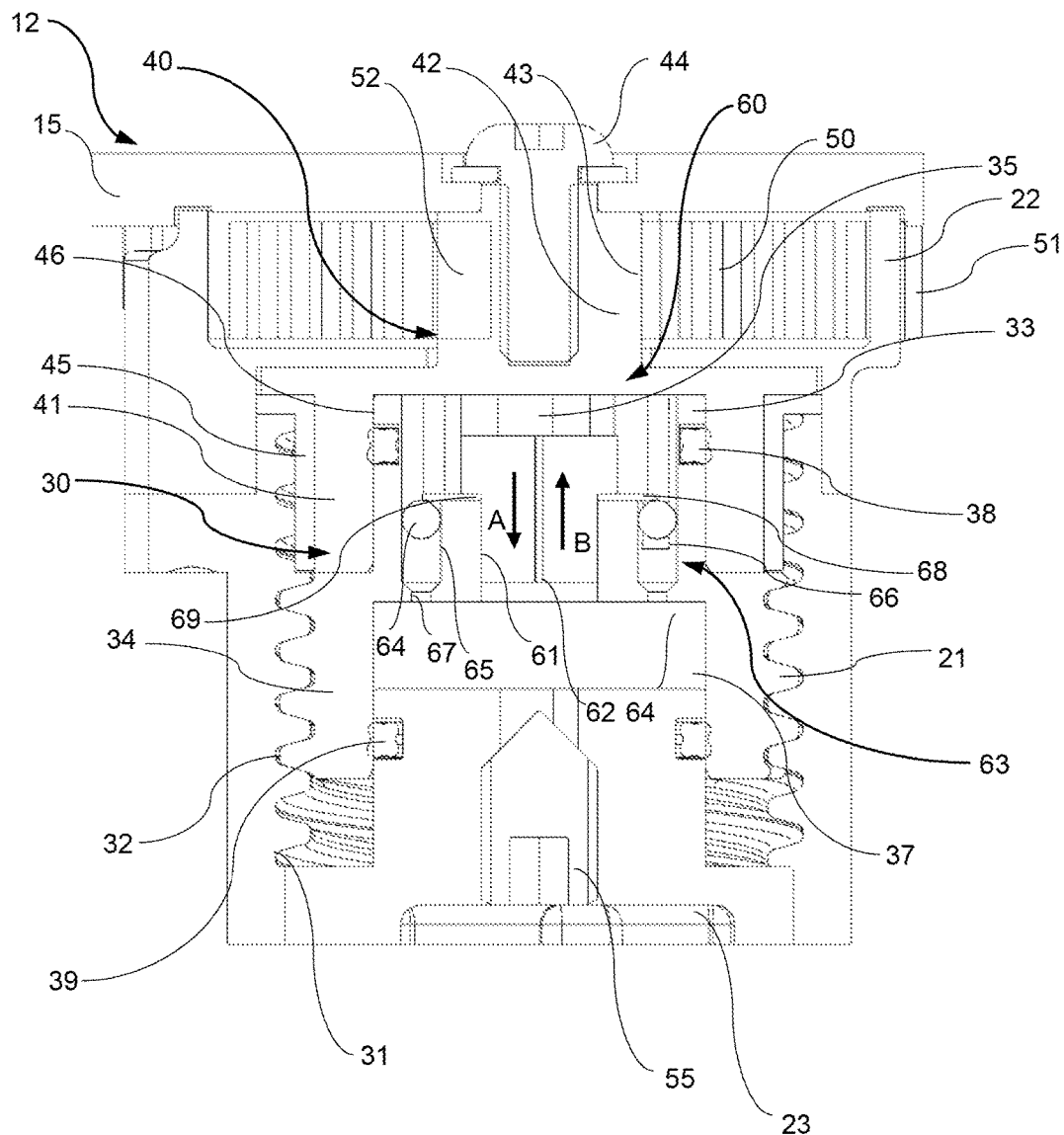
FIG. 5 is an enlarged section view analogous to FIG. 4, in a second, non-damping operating condition.
Figure 6:
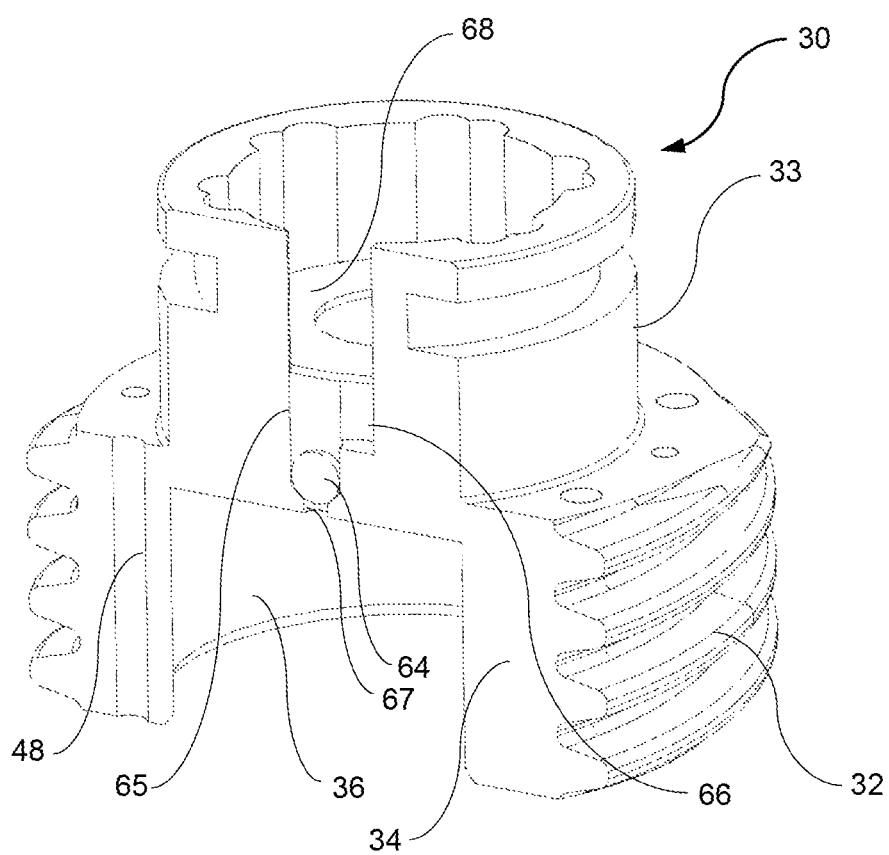
FIG. 6 is a perspective partial section view of the dividing body of the mobile body of FIG. 4, in a first, damping operating condition.

When the chain guide 15 is moved angularly about the axis X in the direction opposite to TC, the same angular movement is transmitted to the trailing body 40 (fixed to the chain guide 15 by the screw 44) and thus to the dividing body 30, thanks to the action of the pins 47. Due to this rotation, the dividing body 30 (constrained by the helical coupling to the load-bearing body 21 of the mobile body 12) also moves axially along the axis X; the winding direction of the helixes 31 and 32 is such that an angular movement of the chain guide 15 in the direction opposite to TC corresponds to a translation of the dividing body 30 along the axis X towards the first closing body 22 (i.e. upwards, in FIGS. 3 to 7). This situation corresponds to what is illustrated in FIGS. 4 and 6.

If the dividing body 30 moves towards the first closing body 22 (i.e. upwards, in FIGS. 3 to 7), the volume of the first chamber 35 tends to reduce whereas the volume of the second chamber 37 tends to increase. There is thus a push on the damping fluid that tends to move it in the first direction A, from the first chamber 35 to the second chamber 37, through the fluid passage system 60. The push of the fluid thus takes the mobile shutters 64 against the throttlings 67 and this causes the peripheral channels 63 to close. Consequently, the fluid can only pass through the calibrated nozzle 62. This passage results in a braking action that—as known—is proportional to the speed of the fluid, i.e. to the speed of movement of the dividing body 30 along the axis X.

Therefore, the greater is the speed of accidental movement of the chain guide 15, the greater is the reaction of the derailleur 10 to prevent such movement.

Once the stress that caused the movement of the chain guide 15 has ended, the latter is in a deviated position and is subjected to the elastic return action of the spring 50, in the direction TC.

Figure 7:
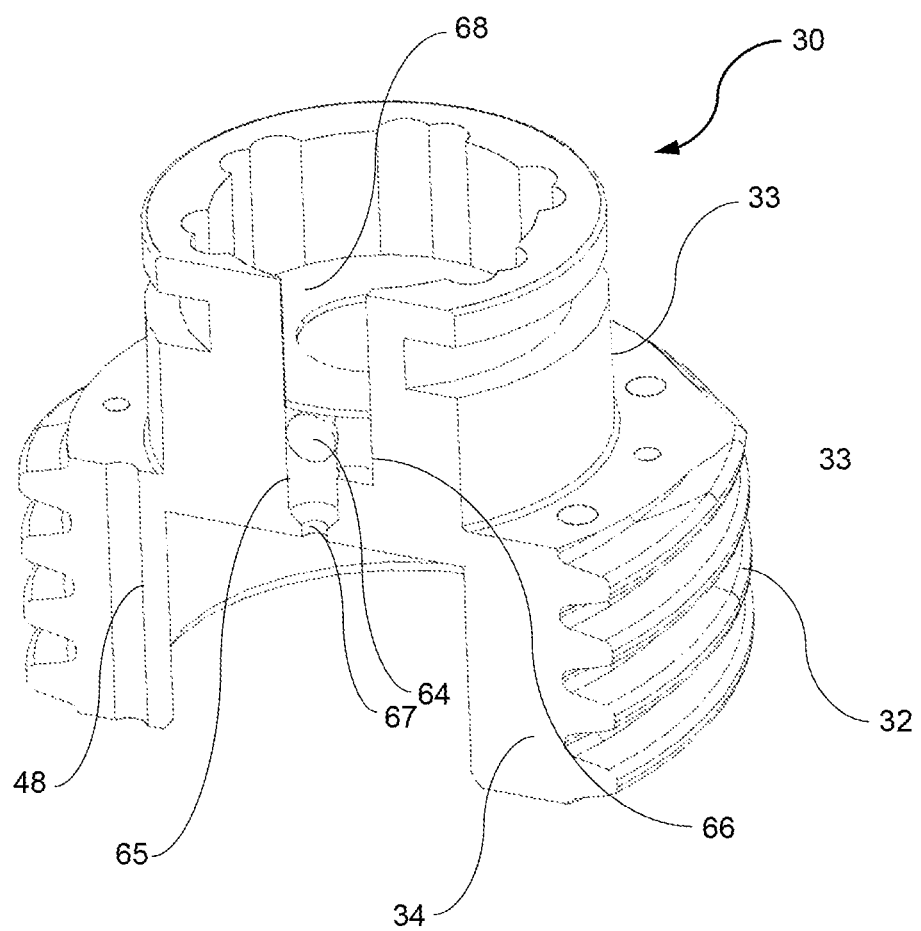
FIG. 7 is a perspective partial section view analogous to FIG. 6, in a second, non-damping operating condition.

The chain guide 15 is thus moved angularly about the axis X in direction TC, and the same angular movement is transmitted to the trailing body 40 and to the dividing body 30. Due to this rotation, the dividing body 30 moves axially along the axis X, towards the second closing body 23 (i.e. downwards in FIGS. 3 to 7). This situation corresponds to what is illustrated in FIGS. 5 and 7.

When the dividing body 30 moves towards the second closing body 23, the volume of the first chamber 35 tends to increase whereas the volume of the second chamber 37 tends to reduce. There is thus a push on the damping fluid that tends to move it in the direction B, from the second chamber 37 to the first chamber 35, through the fluid passage system 60. The push of the fluid thus takes the mobile shutters 64 against the thrust wheel 68 and thus results in the opening of the peripheral channels 63: if the shutters 64 also partially obstruct the main holes 65, the auxiliary holes 66 remain completely free. Consequently, the fluid is not forced to pass only through the calibrated nozzle 62, but rather can flow substantially freely through the peripheral channels 63. This passage results in a substantial absence of braking action that allows the chain guide 15 to quickly take up its ideal position again.

If, on the other hand, the movements of the dividing body 30 occur slowly (because the chain guide 15 moved slowly, as a consequence of normal gearshifting), the resistance that the fluid encounters—also in passing through the calibrated nozzle 62—in any case becomes negligible; therefore, gearshifting is not hindered in the slightest.

Figure 8:
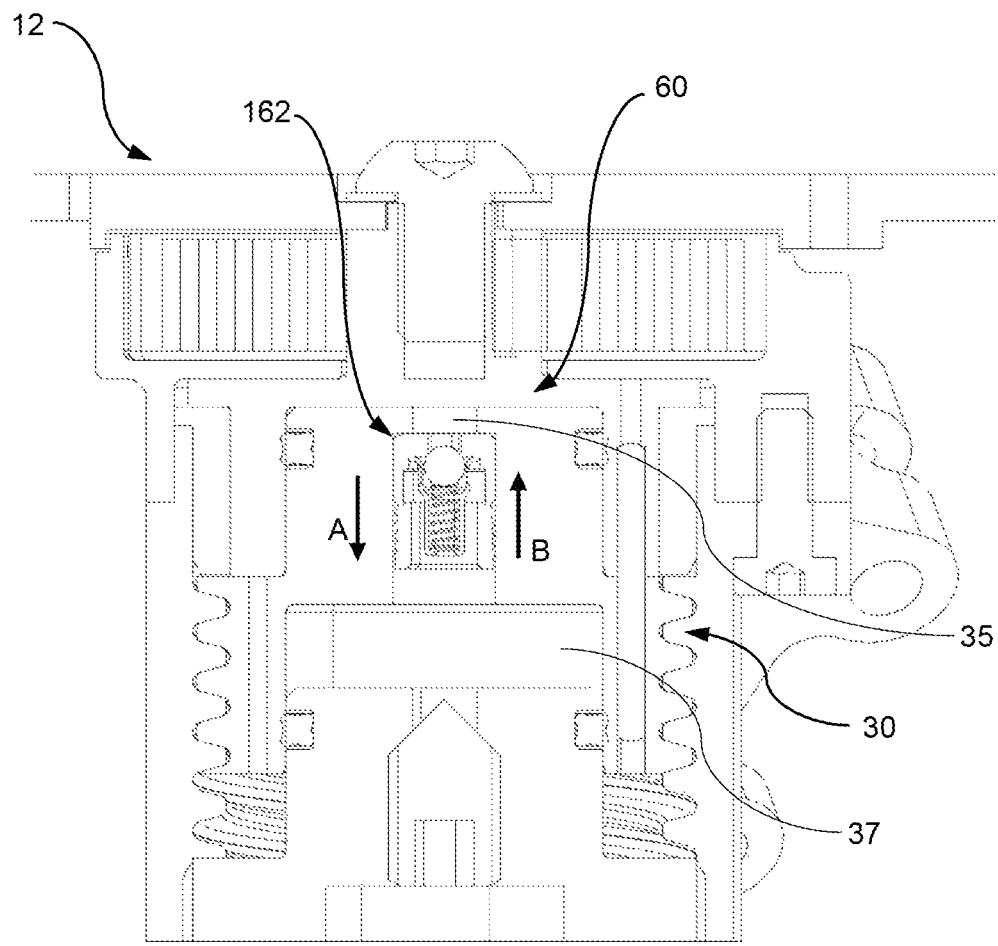
FIG. 8 is an enlarged section view of part of the mobile body of FIG. 3 according to a second embodiment of the invention.

According to a second embodiment of the invention, shown in FIG. 8, the fluid passage system 60 comprises a directional valve 162 housed in the central channel 61, i.e. a valve available on the market inside which the nozzle and the port are formed: in the first direction A, the flow of the fluid is braked, in proportion to the speed, whereas it is free in the direction B. The operation remains substantially the same as just described with reference to the first embodiment.

What is claimed is:

1. A derailleur of a bicycle gearshift, comprising a fixed body adapted for being mounted on the bicycle, a mobile body associated in a moveable manner with the fixed body, a chain guide mounted in an angularly mobile manner on the mobile body about an axis (X) and adapted to engage a transmission chain, an elastic system between the chain guide and the mobile body to push the chain guide in a predetermined angular direction with respect to the mobile body so as to keep the transmission chain under tension, a damper, between the chain guide and the mobile body to brake angular movements of the chain guide with respect to the mobile body, wherein the damper comprises a first and a second variable volume chamber filled with a damping fluid and in connection with each other through a controlled fluid passage system, wherein the angular movement of the chain guide determines variations in an opposite direction of volume of the first and of the second chamber and consequently a fluid overflow between the first and the second chamber through the controlled fluid passage system, wherein
  the damper comprises a dividing body in the mobile body coaxial to the axis (X), mechanically constrained so that each rotation of the dividing body about the axis (X) is accompanied by a translation of the dividing body along the axis (X) itself;
  the dividing body is mechanically constrained to the chain guide so as to move together with it in the angular direction about the axis (X); and,
  the two first and second chambers are formed in the mobile body, on opposite sides of the dividing body, and thus change volume in the opposite direction when the dividing body moves in the mobile body along the axis (X).

2. The derailleur according to claim 1, wherein the dividing body is mechanically constrained to the mobile body through a helical coupling, comprising an internal helix formed in the mobile body engaged with an external helix formed on the dividing body.

3. The derailleur according to claim 2, wherein the mobile body comprises:
  a load-bearing body, having an annular shape around the axis (X), in which the internal helix is formed;
  a first and a second closing body, mounted fixed in a tight manner on the load-bearing body on opposite sides in the direction of the axis (X); and,
  a trailing body, having an inner portion and an outer portion coaxial along the axis (X) and fixedly connected to one another, wherein the inner portion is enclosed between the load-bearing body and the first closing body, rotatably mounted in a tight manner about the axis (X), and wherein the outer portion projects through an axial opening of the first closing body and is mounted fixedly connected to the chain guide.

4. The derailleur according to claim 3, wherein the dividing body comprises a male portion and a female portion, coaxial along the axis (X) and fixedly connected to one another, wherein:
  the male portion is slidably inserted in a tight manner in a cylindrical cavity formed in the inner portion of the trailing body, the first variable volume chamber being defined between this male portion and this cylindrical cavity;
  in the female portion a cylindrical cavity is formed that receives in a sliding, rotatable and tight manner—a male portion of the second closing body, the second chamber with variable volume being defined between this male portion and this cylindrical cavity; and,
  on the female portion of the dividing body, the external helix is formed.

5. The derailleur according to claim 4, wherein the male portion of the dividing body and the male portion of the second closing body, as well as the cylindrical cavity of the trailing body and the cylindrical cavity of the dividing body, have the same cross section.

6. The derailleur according to claim 3, wherein the dividing body is mechanically constrained to the trailing body and through this to the chain guide by means of at least one pin, extending parallel to the axis (X) and in longitudinal sliding engagement in holes formed in the dividing body (30) and in the trailing body, respectively.

7. The derailleur according to claim 1, wherein the controlled fluid passage system is adapted to allow passage of fluid in a first direction through a calibrated nozzle, and to allow the passage of fluid in a second direction opposite the first direction through a port of much larger size with respect to the nozzle.

8. The derailleur according to claim 7, wherein the first direction is from the first to the second variable volume chamber and the second direction is from the second to the first variable volume chamber.

9. The derailleur according to claim 7, wherein the controlled fluid passage system comprises a directional valve inside which the nozzle and the port are formed.

10. The derailleur according to claim 7, wherein the controlled fluid passage system comprises a central channel in which the nozzle is housed and at least one peripheral channel in which the port is formed, provided with a mobile shutter that closes the port in the presence of a push of fluid in a predetermined direction.

11. The derailleur according to claim 1, wherein the controlled fluid passage system is housed in the dividing body.

* * * * *